United States Patent
Liang et al.

(10) Patent No.: US 12,294,573 B2
(45) Date of Patent: May 6, 2025

(54) SECURELY PRESERVING PRIOR SECURITY TOKENS FOR RECALL

(71) Applicant: International Business Machines Corporation, Armonk, NY (US)

(72) Inventors: Chunlong Liang, Travis, TX (US); Jose Angel Rodriguez, Austin, TX (US); James T. Mulvey, Red Hook, NY (US); Jose I. Ortiz, Raleigh, NC (US); Xiaoyan Yanni Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 17/547,559

(22) Filed: Dec. 10, 2021

(65) Prior Publication Data
US 2023/0188515 A1    Jun. 15, 2023

(51) Int. Cl.
H04L 9/40 (2022.01)
G06F 9/54 (2006.01)
H04L 9/32 (2006.01)
H04L 67/02 (2022.01)

(52) U.S. Cl.
CPC ............ *H04L 63/083* (2013.01); *G06F 9/547* (2013.01); *H04L 9/3213* (2013.01); *H04L 9/3226* (2013.01); *H04L 67/02* (2013.01)

(58) Field of Classification Search
CPC ... H04L 9/3247; H04L 9/3236; H04L 9/3297; H04L 63/123; H04L 63/18; G06F 21/57; G06F 21/64; G06F 21/602
See application file for complete search history.

(56) References Cited

U.S. PATENT DOCUMENTS

| | | |
|---|---|---|
| 9,426,140 B2 | 8/2016 | Palmeri |
| 9,774,581 B2 | 9/2017 | Leicher |
| 10,110,584 B1 | 10/2018 | Schmoyer |
| 10,341,410 B2 | 7/2019 | Lander |
| 10,878,079 B2 | 12/2020 | Vepa |

(Continued)

FOREIGN PATENT DOCUMENTS

| | | |
|---|---|---|
| CN | 106230601 A | 12/2016 |
| CN | 109639672 A | 4/2019 |

(Continued)

OTHER PUBLICATIONS

International Search Report and Written Opinion, International Application No. PCT/CN2022/133716, International Filing Date Nov. 23, 2022.

(Continued)

*Primary Examiner* — Henry Tsang
*Assistant Examiner* — Suman Debnath
(74) *Attorney, Agent, or Firm* — Monchai Chuaychoo

(57) ABSTRACT

An approach for optimizing security token exchange. The approach receives a first request from a client. The approach extracts a first security token and an API reference. The approach validates the first security token. If the security token is valid, then the approach, calls the API and retrieves a second security token, embeds the second security token in the API and sends a second request with a third security token and the reference to the API to another application in a different domain.

20 Claims, 7 Drawing Sheets

(56) References Cited

U.S. PATENT DOCUMENTS

| | | | | |
|---|---|---|---|---|
| 2005/0223413 | A1* | 10/2005 | Duggan | G06F 21/6236 |
| | | | | 726/3 |
| 2009/0083652 | A1* | 3/2009 | Krasner | G06F 16/25 |
| | | | | 715/772 |
| 2012/0323654 | A1 | 12/2012 | Writer | |
| 2015/0026466 | A1* | 1/2015 | Riegel | H04L 9/3242 |
| | | | | 713/168 |
| 2016/0277413 | A1* | 9/2016 | Ajitomi | H04L 67/12 |
| 2016/0316367 | A1 | 10/2016 | Rose | |
| 2017/0270723 | A1 | 9/2017 | He | |
| 2019/0327223 | A1 | 10/2019 | Kumar | |
| 2021/0135875 | A1* | 5/2021 | Jeffrey | H04L 63/126 |
| 2021/0367954 | A1* | 11/2021 | Daga | H04L 63/0838 |

FOREIGN PATENT DOCUMENTS

| | | |
|---|---|---|
| CN | 110225050 A | 9/2019 |
| CN | 110933092 A | 3/2020 |
| CN | 111277550 A | 6/2020 |
| CN | 112260838 A | 1/2021 |
| EP | 3311548 B1 | 4/2019 |
| WO | 2020252897 A1 | 12/2020 |
| WO | 2023103776 A1 | 6/2023 |

OTHER PUBLICATIONS

Jones et al., "OAuth 2.0 Token Exchange", Internet Engineering Task Force (IETF), downloaded from the internet on Sep. 7, 2021, 23 pages, <https://datatracker.ietf.org/doc/html/rfc8693>.

Mell et al., "The NIST Definition of Cloud Computing", Recommendations of the National Institute of Standards and Technology, Special Publication 800-145, Sep. 2011, 7 pages.

* cited by examiner

SECURELY PRESERVING PRIOR SECURITY TOKENS FOR RECALL

TECHNICAL FIELD

The present invention relates generally to token exchange, and specifically, to preserving prior security tokens for token exchange.

BACKGROUND

A security token is a set of information that contains identity attributes and security attributes in one or more security domains. Although the JavaScript Object Notation (JSON) Web Tokens (JWT) has emerged as the de-facto security token, there are other security tokens such as XML tokens.

In practical use, it is common for security tokens to be exchanged between different security domains. For example, in hybrid cloud, or multiple clouds environments, security tokens are often exchanged or translated between different security clouds. In another example, identity federation and broker, one identity provider builds security tokens from security tokens issued by another identity provider. In another example, consider one server calling another server on behalf of remote caller, the calling server can impersonate the remote caller or delegate to another related identity, in either case, an identity token has been exchanged.

In security token exchange, it is common practice for a new token to maintain a reference to a prior token. In one example related to token references in token exchanges, IBM cloud builds JWT "access token" to include IAM's "access token" after a user is authenticated by an external IAM. An example JSON object from the new JWT is as follows:

"iam": {"accessToken": "<IAM ACCESS TOKEN>"}.

Currently, most token exchange implementations either embed a prior token inside a newly issued token, or simply include some unique user attribute from a prior token. There are drawbacks in existing approaches. Considering drawbacks of an embedding method, a new token size can be significantly increased, which may make the token useless. For example, if a token is placed as a HyperText Transfer Protocol (HTTP) cookie or header, the token could be truncated due to a browser limitation. Another drawback is that a new token voluntarily exposes prior token contents to parties that are not authorized to see the token. Further, if only a portion of a prior token, e.g., an attribute, is included, it can prevent an upstream service from revalidating a prior identity token if full access to the prior token is necessary.

BRIEF SUMMARY

According to an embodiment of the present invention, a computer-implemented method for optimizing security token exchange, the computer-implemented method comprising: receiving, by one or more processors, at a second service in a second domain, a first request from a client in a first domain; extracting, by the one or more processors, a second security token, associated with a security service in the second domain, and a reference to an application programming interface (API) associated with the first request; validating, by the one or more processors, the second security token at the second security service; and responsive to the second security token being valid, executing actions comprising: retrieving, by the one or more processors, a first security token, associated with the first domain, based on a call to the API; embedding, by the one or more processors, the second security token in the API; and sending, by the one or more processors, a second request comprising a third security token and the reference to the API to a third service in a third domain; responsive to the second security token not being valid, sending, by the one or more processors, a reply to the client in the first domain denying the first request.

According to an embodiment of the present invention, a computer program product for optimizing security token exchange, the computer program product comprising: one or more non-transitory computer readable storage media and program instructions stored on the one or more non-transitory computer readable storage media, the program instructions comprising: program instructions to receive at a second service in a second domain, a first request from a client in a first domain; program instructions to extract a second security token, associated with a security service in the second domain, and an application programming interface (API) associated with the first request; program instructions to validate the second security token at the second security service; and responsive to the second security token being valid, program instructions to execute actions comprising: program instructions to retrieve a first security token, associated with the first domain, based on a call to the API; program instructions to embed the second security token in the API; and program instructions to send a second request comprising a third security token and the API to a third service in a third domain; responsive to the second security token not being valid, program instructions to send a reply to the client in the first domain denying the first request.

According to an embodiment of the present invention, a computer system for optimizing security token exchange, the computer system comprising: one or more computer processors; one or more non-transitory computer readable storage media; and program instructions stored on the one or more non-transitory computer readable storage media, the program instructions comprising: program instructions to receive at a second service in a second domain, a first request from a client in a first domain; program instructions to extract a second security token, associated with a security service in the second domain, and an application programming interface (API) associated with the first request; program instructions to validate the second security token at the second security service; and responsive to the second security token being valid, program instructions to execute actions comprising: program instructions to retrieve a first security token, associated with the first domain, based on a call to the API; program instructions to embed the second security token in the API; and program instructions to send a second request comprising a third security token and the API to a third service in a third domain; responsive to the second security token not being valid, program instructions to send a reply to the client in the first domain denying the first request.

Other aspects and embodiments of the present invention will become apparent from the following detailed description, which, when taken in conjunction with the drawings, illustrate by way of example the principles of the invention.

DETAILED DESCRIPTION

Figure 1:
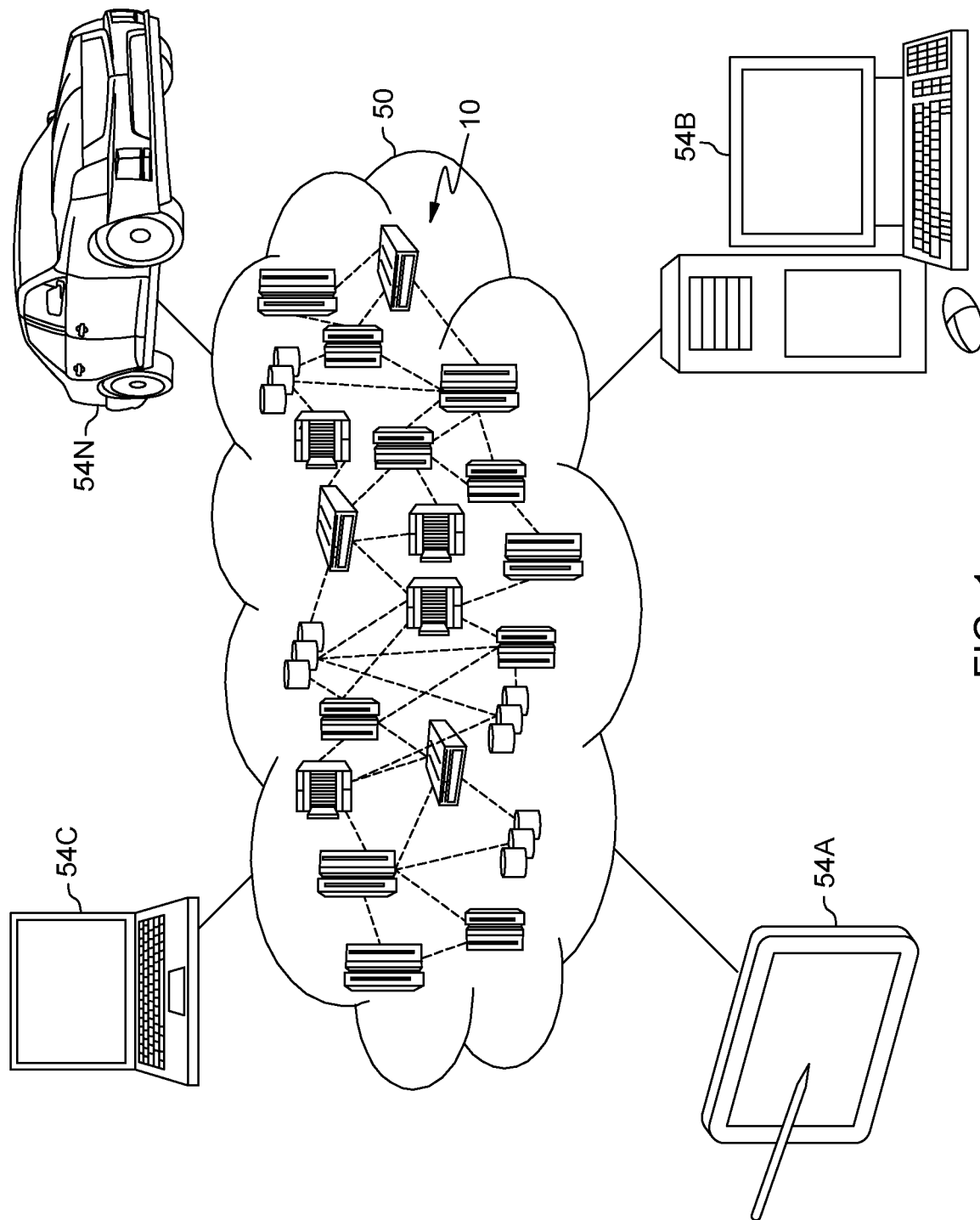
FIG. 1 depicts a cloud computing environment, according to embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of preserving prior obtained security tokens for token exchange. It should be noted that the security token is preserved in a secure, operable, and restful manner, suitable for future token exchange.

Embodiments of the present invention can interact with client applications, intermediate applications, upstream applications and at least two identity and token services. It should be noted that the identity and token services can be from at least two different domains.

In another aspect of an embodiment of the present invention, a client application can be user agents like web browser, a common line interface, or any application that acquires a security token and presents the security token to services. In a further aspect of an embodiment, an intermediate application server can be an application that calls another application on behalf of a client application.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
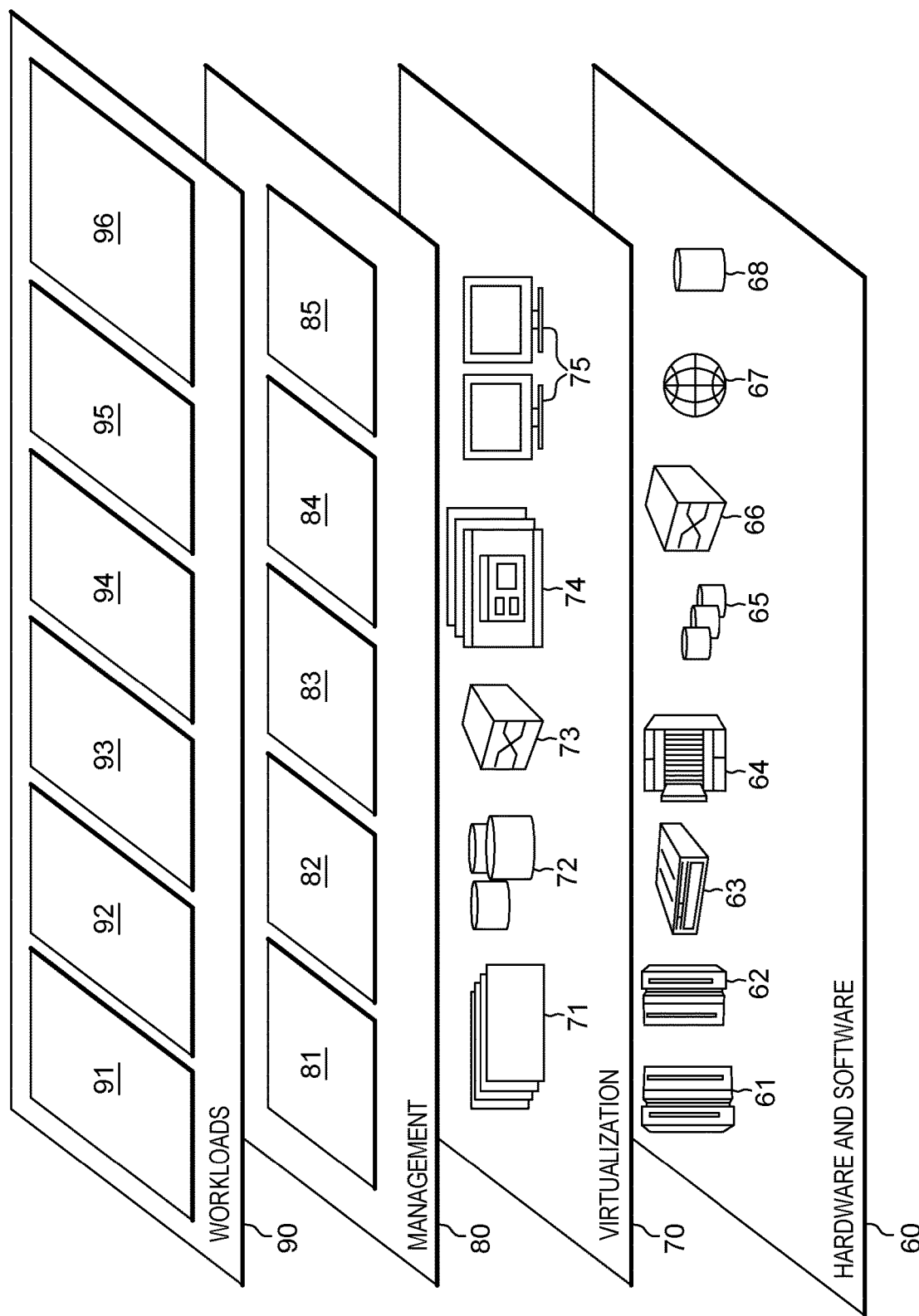
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and token exchange management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
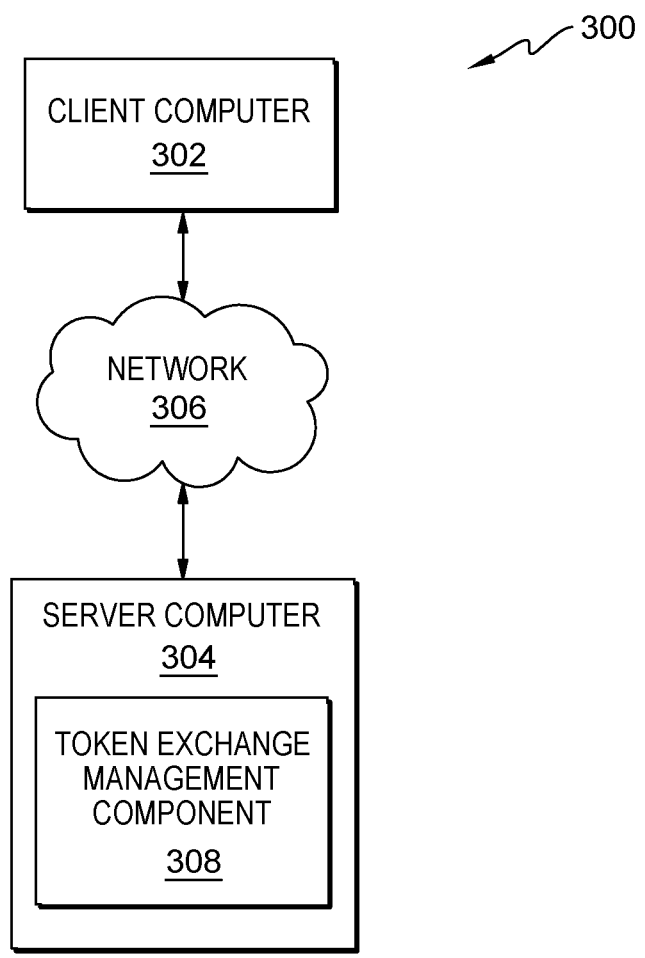
FIG. 3 is a high-level architecture, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a storage optimization system, to which the invention principles may be applied. The architecture 300 comprises a client computer 302, a token exchange management component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

In one embodiment of the present invention, token exchange management component 308, operational on server computer 304, can save previously obtained security tokens for later retrieval. It should be noted that the saved security is preserved without the requirement to embed the saved security token inside a newly issued security token, associated with a security service in a different domain or expose any information associated with the saved security token. In another embodiment of the present invention, token exchange management component 308 can provide the capability to reference the preserved security token through a Uniform Resource Locator (URL) application programming interface (API) after providing credentials acceptable by token exchange management component 308. In another embodiment of the present invention, token exchange management component 308 can retrieve the first JWT security token based on a second JWT security token.

Figure 4:
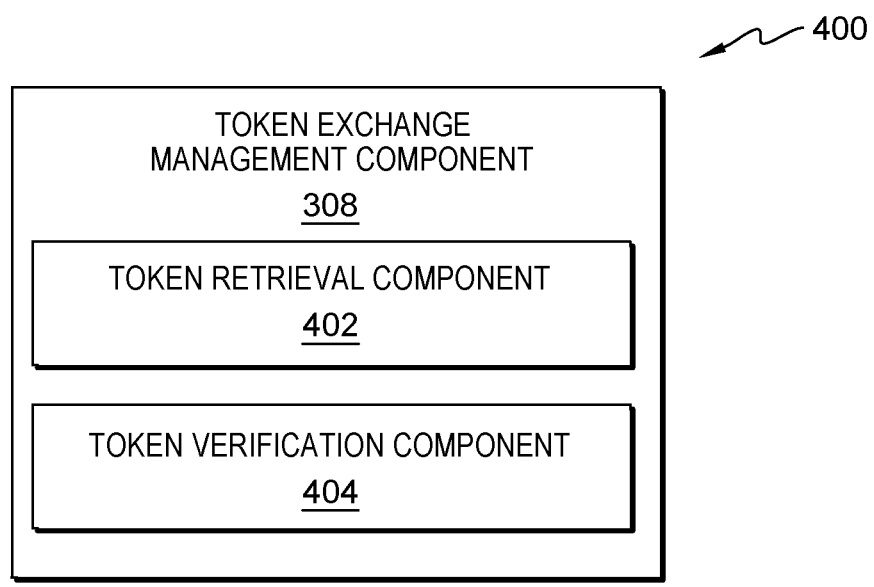
FIG. 4 is an exemplary detailed architecture, according to embodiments of the present invention.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a token exchange management component 308, which can further comprise a token retrieval component 402, and a token verification component 404.

In one aspect of an embodiment of the present invention, token retrieval component 402 can use an URL to reference a first security token associated with a security service in a first domain from a second domain. It should be noted that the URL is an API that can be invoked to retrieve the first security token. In another aspect of the embodiment, the URL is exclusively protected by a second security token associated with a second security service in the second domain. In another aspect of the embodiment, an API server providing the URL API can verify the second security token based on matching the URL to an URL inside the JWT associated with the second security service before returning the JWT associated with the first security service to the API caller. It should be noted that additional access control can be enforced before allowing invocation of the API associated with the embedded security token URL.

For example, decoding a JWT security token payload associated with the second security service for a second security token consumer call is as follows:

```
{
    "can_refresh_until": 1602993035323,
    "exp": 1602993071,
    "iam": {
        "accesstoken": "https://domain2.example.com/abc123"
    },
    "iat": 1602949871,
    "iss": https://domain2.example.com",
    "aud": "DSX",
    "sub": joe@domain2.example.com
}
```

Accordingly, if the second security token consumer call requires access to the first security token in relation to the call, then an HTTPS call can be issued as follows:
Post/abc123 HTTP/1.1
Host: domain2.example.com
Authorization: Bearer<Base 64 encoded JWT>

In another aspect of an embodiment of the present invention, token verification component 404 can provide the capability to verify the JWT from the bearer header before providing access to a prior security token. In one aspect of an embodiment, token verification component 404 can match the URL associated with the requesting URL to a JWT reference claim inside the token associated with the request. In another aspect of an embodiment, in general, token verification component 404 can provide a restful service a previous security token wherein each issued JWT contains a reference to a previous security token, e.g., in a different domain, in an authentication request and the JWT token reference is an URL or a resource identifier. In another aspect of an embodiment, the previous security token can be securely retrieved, e.g., the security token can be retrieved only if the authentication token a matching token reference.

It should be noted that embodiments of the present invention can be extended to multiple token exchanges and in another aspect of an embodiment, token exchange history can be stored and securely provided. Further, embodiments of the present invention can be simplified. For example, if the host for a token reference API is the same as the token issuer, then the token reference can be simplified to be a resource identification (ID). It should be noted that under these simplified circumstances, to retrieve a first token, a caller can simply provide a request with "Issuer" as the host name to request a resource with a value of a token reference as a resource ID.

Figure 5A:
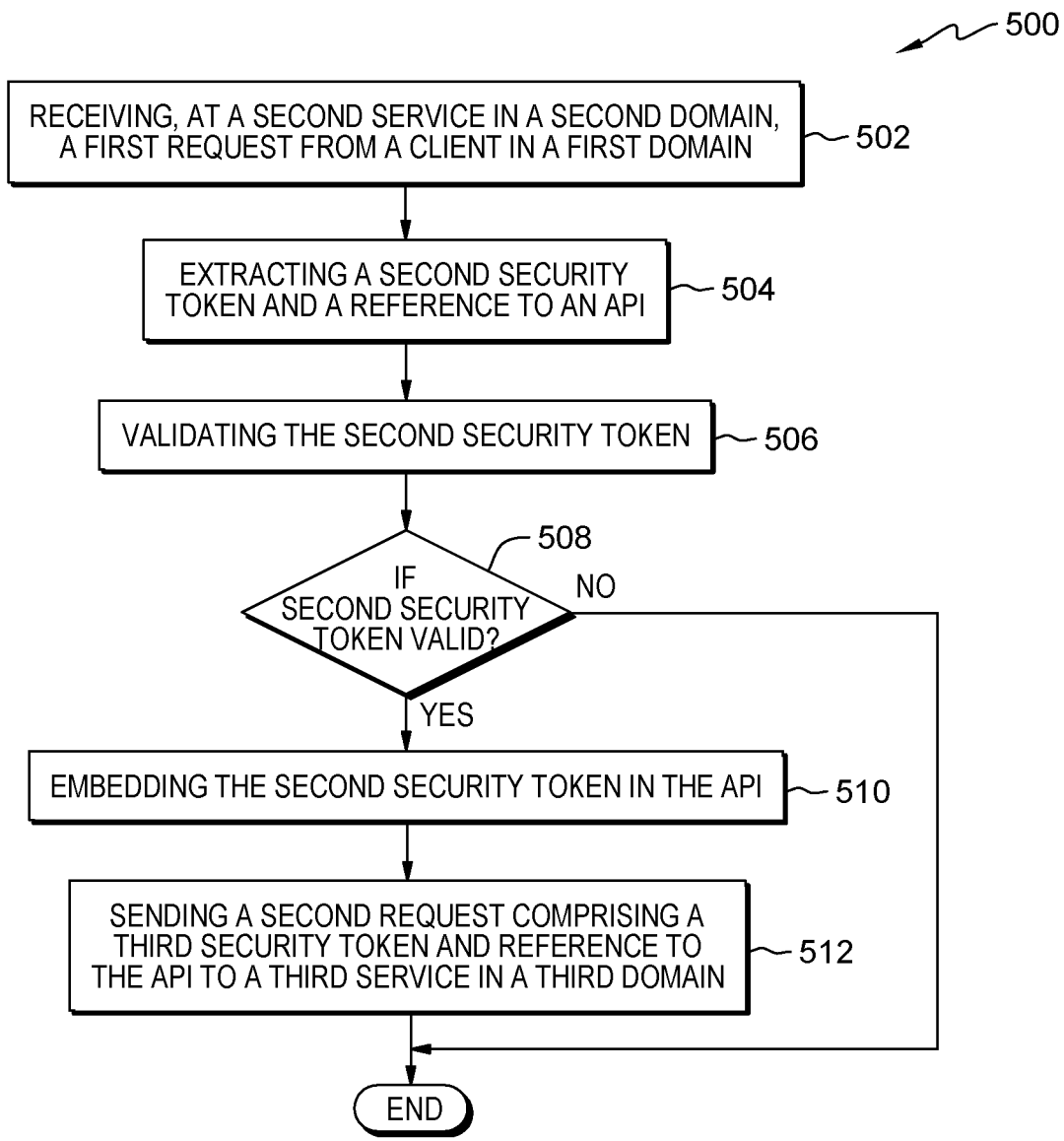
FIG. 5A is a flowchart of a method, according to embodiments of the present invention.

FIG. 5A is an exemplary flowchart of a method 500 for optimizing security token exchange. At step 502, an embodiment can receive, via token retrieval component 402, a first request from a client in a first domain at a second service in a second domain. At step 504, the embodiment can extract, via token retrieval component 402, a second security token and a reference to an API. At step 506, the embodiment can validate, via token verification component 404, the second security token. At step 508, the embodiment can determine, via token verification component 404, if the second security token is valid. If the second security token is valid, then the embodiment continues to step 510. If the second security token is not valid, then the embodiment ends. At step 510, the embodiment can embed, via token exchange management component 308, the second security token in the API. At step 512, the embodiment can, via token exchange management component 308, send a second request comprising a third security token and a reference to the API to a third service in a third domain.

Figure 5B:
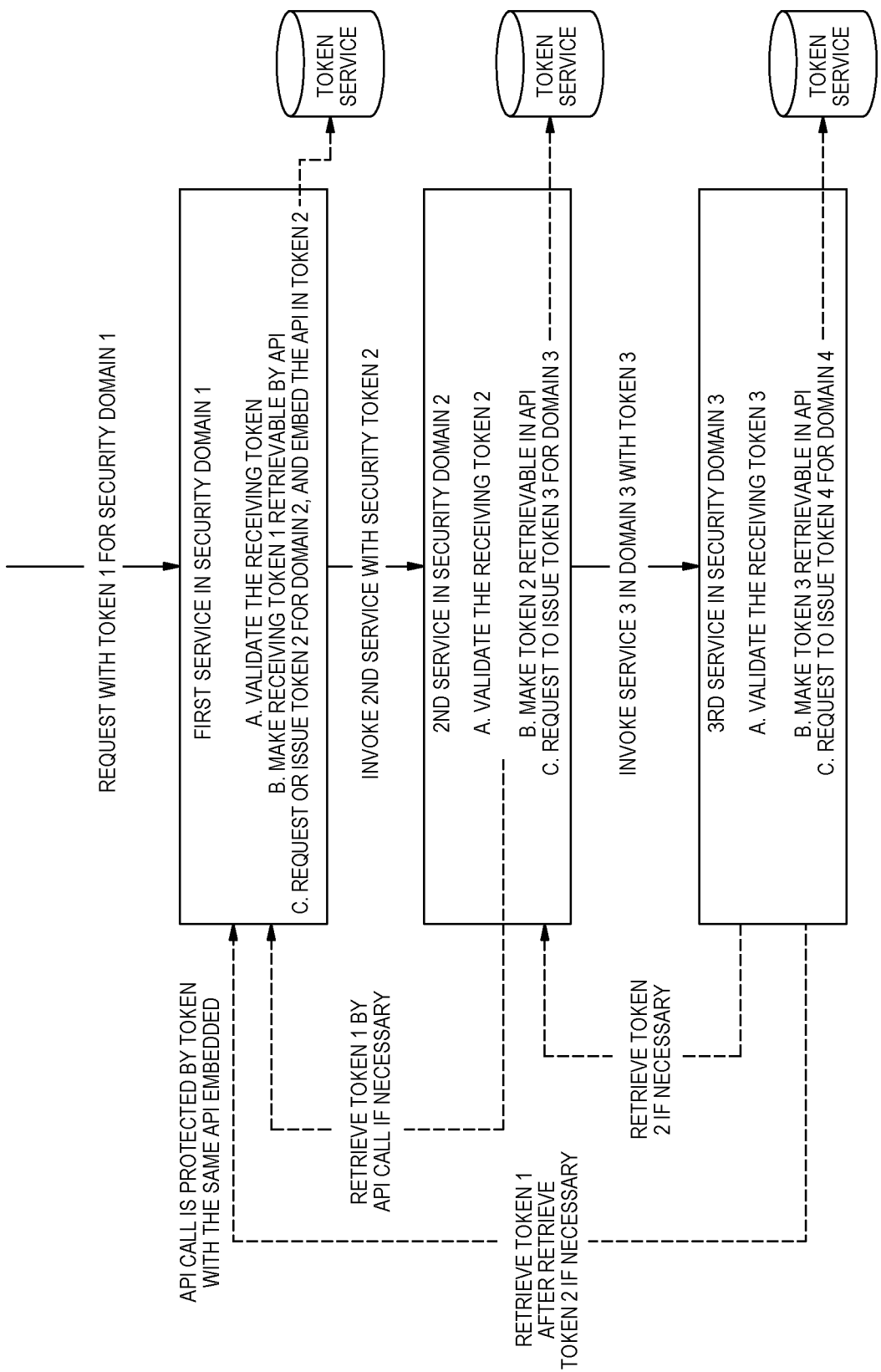
FIG. 5B is an example of an embodiment associated with three service requests in three different domains having three different security token services in the three different domains.

FIG. 5B is an example 550 of an embodiment associated with three service requests in three different domains having three different security token services in the three different domains. In an embodiment, a first request is sent for a first service residing in a first domain with an associated first security service. The embodiment validates a first security token received with the first request, processes the request, making the first security token retrievable with an associated first API.

Further, the first request requires a second service residing in a second domain with an associated second security service. Depending on whether the embodiment has previously requested a service from the second domain, the embodiment either requests or issues a second security token for the second security service associated with the second domain and embeds the first API in the second security token before sending the second request to invoke a second service in the second domain.

Further, the embodiment validates the second security token received with the first request, processes the request, making the second security token retrievable with an associated second API. In another aspect, the second request requires a third service residing in a third domain with an associated third security service. Depending on whether the embodiment has previously requested a service from the third domain, the embodiment either requests or issues a third security token for the third security service associated with the third domain and embeds the second API in the third security token before sending the third request to invoke a third service in the third domain.

Further the embodiment validates the third security token received with the third request, processes the request, making the third security token retrievable with an associated third API. In another aspect, if the fourth request is required, a fourth service residing in a fourth domain with an associated fourth security service can continue the embodiment. Depending on whether the embodiment has previously requested a service from the fourth domain, the embodiment either requests or issues a fourth security token for the fourth security service associated with the fourth domain and embeds the third API in the fourth security token before invoking the fourth service in the fourth domain. It should be noted that the Third security service can retrieve the first security token from the first security service after retrieving the second security token from the second security service if the access to services in the first domain is required.

Figure 6:
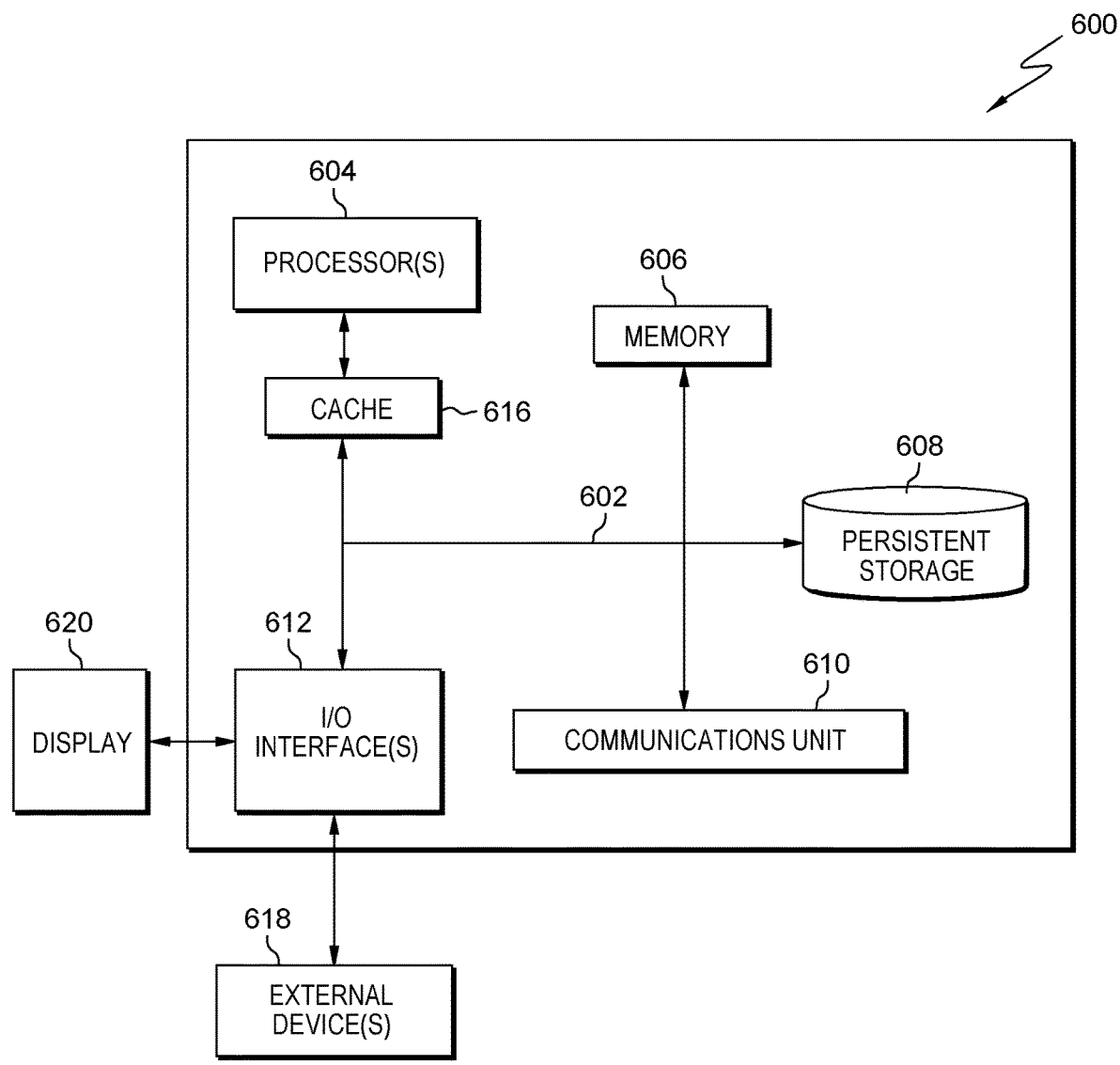
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing security token exchange associated with a plurality of domains, the computer-implemented method comprising:
   receiving, by one or more processors, at a second service in a second domain, a first request from a client in a first domain;
   extracting, by the one or more processors, a second security token, associated with a security service in the second domain, and a reference to a first application programming interface (API) from one or more APIs associated with the first request;
   validating, by the one or more processors, the second security token at the second security service, wherein the second security token contains a second bearer header;
   responsive to the second security token being valid, executing actions comprising:
      retrieving, by the one or more processors, a first security token, associated with the first domain, based on a call to the first API, wherein the first security token contains a first bearer header;
      embedding, by the one or more processors, the second security token in a second API; and
      sending, by the one or more processors, a second request comprising a third security token and the reference to the second API from one or more APIs to a third service in a third domain;
   responsive to the second security token not being valid, sending, by the one or more processors, a reply to the client in the first domain denying the first request;
   validating, the third security token from a third request, wherein the third security token is retrievable with a third API from one or more APIs, wherein the third security token contains a third bearer header; and
   storing an exchange history associated with, at least, the first security token, the second security token and previous security tokens, wherein a token reference comprises of, a resource identification based on the exchange history or URL (uniform resource locator) associated with the exchange history.

2. The computer-implemented method of claim 1, wherein the security token is a JavaScript Object Notation (JSON) Web Token (JWT).

3. The computer-implemented method of claim 1, wherein the one or more APIs is a uniform resource locator (URL) to an API.

4. The computer-implemented method of claim 1, wherein the retrieving further comprises the exchange history associated with the first security token.

5. The computer-implemented method of claim 1, wherein the one or more APIs is a resource identifier if a host associated with the one or more APIs is also the host associated with a token issuer.

6. The computer-implemented method of claim 3, wherein the validating further comprises:
   matching, by the one or more processors, an URL associated with a request to an URL embedded in a security token.

7. The computer-implemented method of claim 1, wherein the call to the one or more APIs further comprises providing credentials that are valid to allow access to the one or more APIs.

8. A computer program product for optimizing security token exchange associated with a plurality of domains, the computer program product comprising:
   one or more non-transitory computer readable storage media and program instructions stored on the one or more non-transitory computer readable storage media and executed by one or more processors, the program instructions comprising the steps of:

receiving at a second service in a second domain, a first request from a client in a first domain;

extracting a second security token, associated with a security service in the second domain, and a reference to an application programming interface (API) associated with the first request;

validating the second security token at the second security service, wherein the second security token contains a second bearer header;

responsive to the second security token being valid, executing actions comprising:
  retrieving a first security token, associated with the first domain, based on a call to the API, wherein the first security token contains a first bearer header;
  embedding the second security token in the API; and
  sending a second request comprising a third security token and the reference to the API to a third service in a third domain;

responsive to the second security token not being valid, sending, a reply to the client in the first domain denying the first request;

validating, the third security token from a third request, wherein the third security token is retrievable with a third API from one or more APIs, wherein the third security token contains a third bearer header; and storing an exchange history associated with, at least, the first security token, the second security token and previous security tokens, wherein a token reference comprises of, a resource identification based on the exchange history or URL (uniform resource locator) associated with the exchange history.

9. The computer program product of claim 8, wherein the security token is a JavaScript Object Notation (JSON) Web Token (JWT).

10. The computer program product of claim 8, wherein the one or more APIs is a uniform resource locator (URL) to the one or more APIs.

11. The computer program product of claim 8, wherein the retrieving further comprises the exchange history associated with the first security token.

12. The computer program product of claim 8, wherein the one or more APIs is a resource identifier if a host associated with the one or more APIs is also the host associated with a token issuer.

13. The computer program product of claim 10, wherein the validating further comprises:
  matching, by the one or more processors, an URL associated with a request to an URL embedded in a security token.

14. The computer program product of claim 8, wherein the call to the one or more APIs further comprises providing credentials that are valid to allow access to the one or more APIs.

15. A computer system for optimizing security token exchange associated with a plurality of domains, the computer system comprising:
  one or more computer processors;
  one or more non-transitory computer readable storage media; and
  program instructions stored on the one or more non-transitory computer readable storage media, the program instructions comprising the steps of:
    receiving at a second service in a second domain, a first request from a client in a first domain;
    extracting a second security token, associated with a security service in the second domain, and a reference to an application programming interface (API) associated with the first request;
    validating the second security token at the second security service, wherein the second security token contains a second bearer header;
    responsive to the second security token being valid, executing actions comprising:
      retrieving a first security token, associated with the first domain, based on a call to the API, wherein the first security token contains a first bearer header;
      embedding the second security token in the API; and
      sending a second request comprising a third security token and the reference to the API to a third service in a third domain;
    responsive to the second security token not being valid, sending, a reply to the client in the first domain denying the first request;
    validating, the third security token from a third request, wherein the third security token is retrievable with a third API from one or more APIs, wherein the third security token contains a third bearer header; and
    storing an exchange history associated with, at least, the first security token, the second security token and previous security tokens, wherein a token reference comprises of, a resource identification based on the exchange history or URL (uniform resource locator) associated with the exchange history.

16. The computer system of claim 15, wherein the security token is a JavaScript Object Notation (JSON) Web Token (JWT).

17. The computer system of claim 15, wherein the one or more APIs is a uniform resource locator (URL) to one or more APIs or a resource identifier if a host associated with the one or more APIs is also the host associated with a token issuer.

18. The computer system of claim 15, wherein the retrieving further comprises the exchange history associated with the first security token.

19. The computer system of claim 17, wherein the validating further comprises:
  matching, by the one or more processors, an URL associated with a request to an URL embedded in a security token.

20. The computer system of claim 15, wherein the call to the one or more APIs further comprises providing credentials that are valid to allow access to the one or more APIs.

* * * * *